United States Patent [19]

Sharma et al.

[11] Patent Number: 5,511,190
[45] Date of Patent: Apr. 23, 1996

[54] HASH-BASED DATABASE GROUPING SYSTEM AND METHOD

[75] Inventors: Anoop Sharma, San Jose; Hansjorg Zeller, Los Altos, both of Calif.

[73] Assignee: Tandem Computers, Inc., Cupertino, Calif.

[21] Appl. No.: 376,026

[22] Filed: Jan. 20, 1995

[51] Int. Cl.$^6$ ..................................................... G06F 17/30
[52] U.S. Cl. ................................. 395/600; 364/DIG. 1; 364/282.1; 364/283.4
[58] Field of Search .............................................. 395/600

[56] References Cited

U.S. PATENT DOCUMENTS

| | | | |
|---|---|---|---|
| 5,201,046 | 4/1993 | Goldberg et al. | 395/600 |
| 5,379,419 | 1/1995 | Heffernan et al. | 395/600 |
| 5,404,510 | 4/1995 | Smith et al. | 395/600 |
| 5,412,804 | 5/1995 | Krishna | 395/600 |
| 5,421,008 | 5/1995 | Banning et al. | 395/600 |

OTHER PUBLICATIONS

"Optimizing Parallel Query Plans and Execution"; Harry Leslie; 36th IEEE Computer Society Intl. Conference, Digest of Papers, Spring '91 (Feb. 25–Mar. 1); pp. 105–109.

"Hash Join Algorithms In A Multiuser Environment", Tandem Technical Report 90.4; Part. No. 40048; Tandem Computers Inc. (1990).

*Primary Examiner*—Paul V. Kulik
*Attorney, Agent, or Firm*—Flehr, Hohbach, Test, Albritton & Herbert

[57] ABSTRACT

A structured query language (SQL) grouping and aggregation system and method that incorporates hash-based techniques, several overflow handling strategies and statistics-based process-selection criteria. The method can execute SQL group-by queries on distributed database tables or tables stored locally to the database management system (DBMS) processor executing the grouping method. Hash-based techniques allow groupings and aggregates to be generated on the fly through the use of partial aggregates maintained in primary memory. Where primary memory is limited, groups and aggregates are still generated for as many groups as can be maintained in primary memory, while various overflow procedures are provided for buffering ungrouped data and writing that data to an overflow disk file for later processing. In one overflow procedure, raw data from groups that cannot be aggregated in primary memory are buffered then written to the overflow disk file. In a second overflow procedure, ungroupable raw data is formatted the same as data being aggregated in the group table, buffered, and then written to the overflow file. In a third overflow procedure, ungroupable raw data is partially aggregated in an output buffer maintained in primary memory before being written to the overflow file maintained in secondary memory. Database table statistics maintained by a cataloger are consulted to determine whether hash-based grouping or conventional sort based grouping should be used to execute a group-by query. The system is adaptable to running a grouping query against a partitioned database on distributed processors.

8 Claims, 10 Drawing Sheets

HASH-BASED DATABASE GROUPING SYSTEM AND METHOD

The present invention relates generally to relational database management systems that support SQL queries, and particularly to a hash-based method for performing a group-by SQL query.

BACKGROUND OF THE INVENTION

Most relational database management systems (DBMS) allow users to perform queries on large databases or tables using SQL (structured query language) commands. A common SQL operation is the grouping or aggregation query, which allows a DBMS user to perform computations on attributes of group members, where a "group" is understood to be a collection (e.g., persons, things) sharing a common group identifier (e.g., department, date of manufacture). For example, a user might wish to run a query against an employee database asking for a report of average department salaries grouped by department name. This query can be expressed in SQL as follows:

select dname, avg(salary)
    from emp
    group by dname.

This query requires the DBMS to select department name ("dname") and salary ("salary") columns from an employee ("emp") database table, associate the rows (that is, the selected fields of the rows) of the "emp" ruble into groups comprising salaries for employees belonging to the same department ("dname"), and compute and report average salaries for each department.

Currently, a few different methods exist for executing this group-by query. In the simplest and fastest method, where the group column is a database index, the DBMS need only traverse the memory resident binary tree built on the index, select the subtree corresponding to the group identifier, traverse the subtree accumulating data fields and report the groupings. However, this extremely efficient procedure requires that an ordered index exists on the group column(s).

It is often the case that a user wishes to perform a group-by query on a column or on a combination of columns that is not an index. In this situation, the DBMS must identify the unique values represented by the contents of the designated group column and compute and report the grouping or aggregation requested by the user. This is a far less efficient process than when the group column is a database index, and one that must take into account limited system resources, including available memory, disk space, CPU utilization and networked resources available for distributed processing.

In the Tandem™ NonStop™ SQL/MP relational database management system (DBMS), prior to the present invention the grouping or aggregation query was performed in one of two ways. If the data in the table is already sorted on the group column before the group-by query is issued, data is aggregated for each group as the database table is read row by row. When a change in group is detected, the current group along with any aggregate values for that group are returned to the user. This is a very efficient procedure. In the more likely situation where the data has not been previously sorted on the group column, NonStop™ SQL sorts the table on the group column(s) and then the group-by query proceeds as in the sorted case.

This sort-based procedure presents a number of problems. First, tables over which data is aggregated can be as large as 100 Gigabytes. For example, in the average department salary group-by query set out above, the employee table might comprise data for a million employees from as many as 1000 departments. Sorting this large a table is a highly CPU and I/O intensive operation that requires that rows be repeatedly written to and read from disk during the sort process, which exacts a high cost in inefficiency due to slow I/O operations. Additionally, as it is not likely that a free 100 GB to store the sorted table is available on disks local to the processor handling the query, the employee table would most likely need to be partitioned, the partitions sorted then grouped, and the groups recombined before user reports are generated, the additional steps adding overhead to the process of executing a group-by query. Grouping could also be performed on the database partitions in parallel on distributed processors, but network data transfers are far slower (generally about ⅓ slower) than local data transfers and, as a result, the reported query results would be slowed due to the network traffic required to distribute and reassemble the partitions.

Consequently, there is a need for an SQL grouping procedure that requires less disk and network I/O than the present sort-based method. Additionally, there is a need for a grouping or aggregation process that, through efficient use of computer memory resources, can run largely in memory, yielding increased execution speeds. Given a grouping process designed to run largely in memory, there is also a need for overflow strategies that efficiently utilize disk resources when sufficient memory is not available. Additionally, there is a need for an intelligent front end process to the grouping procedure that can determine based on catalog statistics for a given table whether it would be more efficient to implement the prior art sort-based grouping algorithm or the hash-based approach of the present invention.

SUMMARY OF THE INVENTION

The present invention is directed to an improved procedure for executing SQL grouping and aggregation queries that satisfies the needs set out above. This procedure incorporates hash-based techniques, several novel overflow handling strategies and statistics-based process-selection criteria. The procedure can execute SQL group-by queries on distributed tables or tables stored locally to the DBMS processor executing the grouping procedure. These hash-based techniques allow groupings and aggregates to be generated on the fly through the use of partial aggregates maintained in primary memory. Where memory is limited, groups and aggregates are still generated for as many groups as can be maintained in primary memory, while various overflow procedures are provided for buffering ungrouped data and writing that data to an overflow disk file for later processing.

Specifically, the present invention is directed to a process for performing a grouping operation on a relational database table that is structured in rows and columns, one or more of the columns being designated as group columns, others of the columns being data columns. The first step of the grouping method involves an input procedure reading the database table row by row. For each row, values are picked up for select columns designated in a SQL group-by statement, including a group value or identifier from the group columns, and zero or more data values from the data columns. Next, a matching procedure applies a hash function to the group identifier, generating a hashed group value that serves as an index into a memory-resident hash table that maps hashed group values into corresponding memory-resident group table entries. Each group table entry stores for a single group (i.e., a unique group identifier) aggregates built on the group members' selected data fields, a group identifier, and housekeeping data. The matching procedure then determines from the contents of the hash table whether a group table entry exists corresponding to the group identifier of the new row. When a corresponding group table entry exists, an aggregation procedure aggregates the new data values into the group data fields of that group table entry and updates housekeeping data of the group table entry. When a group table entry corresponding to the hashed group value does not exist, the present invention provides two options for handling the ungrouped data depending on the amount of available memory.

When a corresponding group table entry does not exist and available memory meets predefined memory availability criteria, an initialization procedure allocates an additional group table entry from available memory, updates the appropriate fields of the new group table entry with the new data values, and initializes the housekeeping data of the new group table entry. When available memory does not meet availability criteria, the present invention provides three overflow procedures for handling data from the database table which cannot be accommodated in the group table.

In the first overflow procedure, the selected columns of database rows belonging to groups that can't fit into the group table are buffered then, when the buffer is full, written directly to an overflow disk file without additional processing. The second overflow procedure is similar to the first procedure, except that the overflow rows are reformatted to match the organization of the group table entries before they are buffered.

In the third overflow procedure, overflow rows are partially aggregated into groupings in an output buffer, the contents of which are written to the overflow disk file when the buffer fills up. This procedure utilizes a second memory-resident hash table that maps hashed group values into entries in the output buffer. In this procedure, when the group table is full and a database row is read having a group identifier that is not represented in the group table, the matching function compares the hashed group value to the contents of the second hash table to see whether an output buffer entry exists summarizing data corresponding to the current group identifier. If the corresponding output buffer entry exists, the aggregation procedure aggregates the new data into the appropriate fields of the buffer entry, which is formatted identically to the memory-resident group table entries.

If the corresponding output buffer entry does not exist and if memory meets predetermined memory availability criteria, the initialization procedure allocates an additional output buffer entry from available memory, updates the appropriate fields of the new buffer entry with the new data values, and initializes the housekeeping data of the new buffer entry. If the corresponding output buffer entry does not exist and if memory does not meet predetermined memory availability criteria, the output buffer is appended to the overflow disk file, the old output buffer entries are cleared, a new output buffer entry is allocated from available memory, the appropriate fields of the new output buffer entry are updated with the new data values, and the housekeeping data of the new buffer entry are initialized.

In any one of the three overflow procedures, once all of the database table rows have been read, the group table entries are reported to the user, and the hash grouping operation resumes from the first step, except that data is not read from the database table, but from the overflow data file by an overflow input procedure. The overflow input procedure provided by the present grouping function is adaptable to reflect the differences between the formats of the raw data initially read from the database table and the data read from the overflow file, the row formats of which vary depending on which of the three overflow procedures is executed.

The present invention also provides a front end procedure that determines whether the new, hash grouping method or the old, sort grouping method should be used to process the database table on which the SQL group-by query is to be run. When sufficient memory is not available to efficiently represent in a memory-resident group table the set of unique group values contained within the group column, the front end procedure selects the sort-based grouping method. When memory is adequate, the front end procedure selects the hash-based grouping method of the present invention. To make this decision, the front end procedure relies on statistical group criteria maintained by a database catalog.

Additionally, the present invention is adaptable to running a grouping query against a partitioned database on distributed processors.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
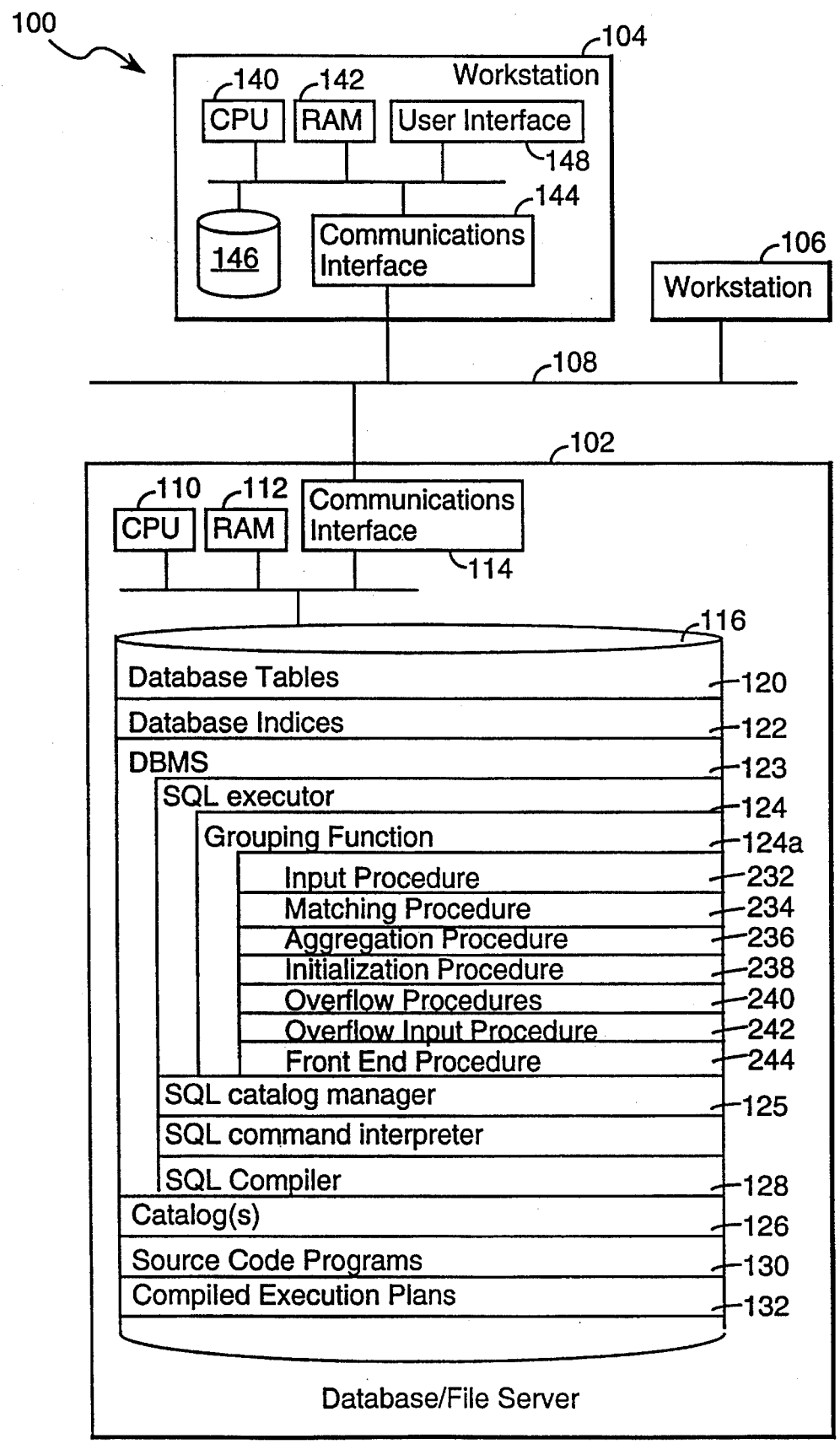
FIG. 1 is a block diagram of a computer system for storing and providing user access to data in stored databases.

Referring to FIG. 1, there is shown a computer system 100 for storing and providing user access to data in stored databases. The system 100 is a distributed computer system having multiple computers 102, 104, 106 interconnected by local area and wide area network communication media 108. The system 100 generally includes at least one database server 102 and many user workstation computers or terminals 104, 106.

When very large databases are stored in a system, the database tables will be partitioned, and different partitions of the database tables will often be stored in different database servers. However, from the viewpoint of user workstation computers 104, 106, the database server 102 appears to be a single entity. The partitioning of databases and the use of multiple database servers is well known to those skilled in the art.

As shown in FIG. 1, the database server 102 includes a central processing unit (CPU) 110, primary memory 112, a communications interface 114 for communicating with user workstations 104, 106 as well as other system resources not relevant here. Secondary memory 116, typically magnetic disc storage, in the database server 102 stores database tables 120, database indices 122, a database management system (DBMS) 123 for enabling user and operator access to the database tables, and one or more catalogs 126 for storing schema information about the database tables 120 as well as directory information for programs used to access the database tables. The DBMS 123 includes an SQL executor 124 that includes a grouping function GF 124a as well as other database management subsystems, such as an SQL catalog manager 125 and an SQL command interpreter. The DBMS 123 further includes an SQL compiler 128 for compiling source code database query programs 130 into compiled execution plans 132. The grouping function GF 124a, which implements the hash grouping method of the present invention, includes an input procedure 232, matching procedure 234, aggregation procedure 236, initialization procedure 238, overflow procedures 240, an overflow input procedure 242, and a front end procedure 244.

End user workstations 104, 106, typically include a central processing unit (CPU) 140, primary memory 142, a communications interface 144 for communicating with the database server 102 and other system resources, secondary memory 146, and a user interface 148. The user interface 148 typically includes a keyboard and display device, and may include additional resources such as a pointing device and printer. Secondary memory 146 is used for storing computer programs, such as communications software used to access the database server 102. Some end user workstations 106 may be "dumb" terminals that do not include any secondary memory 146, and thus execute only software downloaded into primary memory 142 from a server computer, such as the database server 102 or a file server (not shown).

Data Structures

Figure 2:
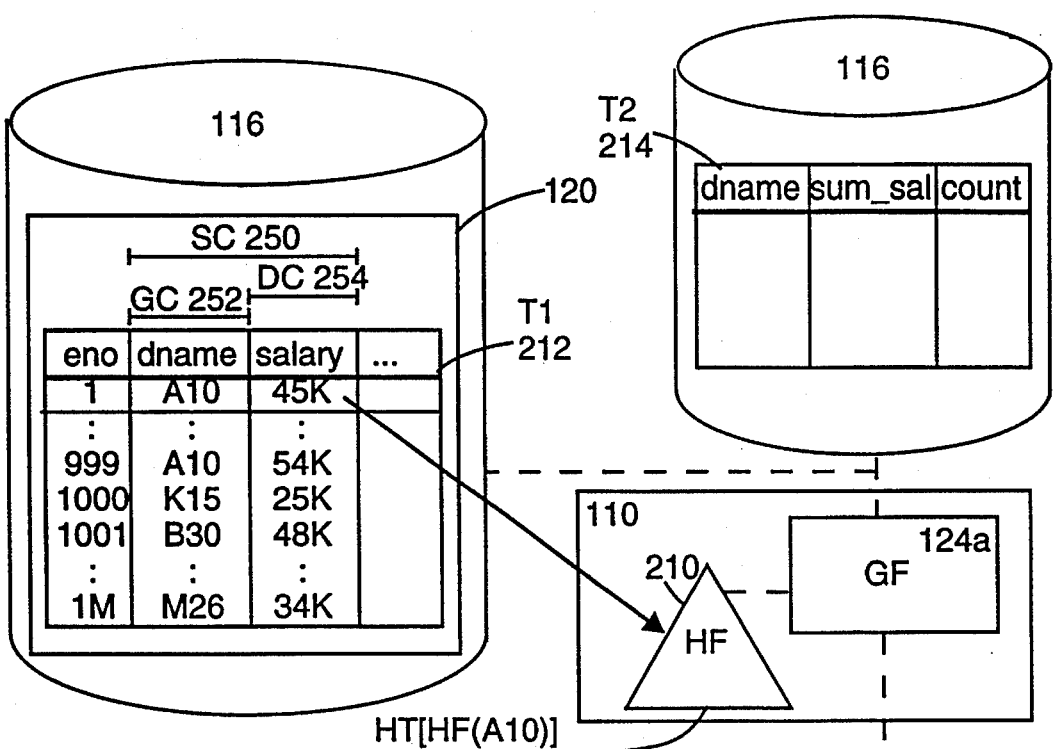
FIG. 2 is a block diagram that shows the data structures provided by the present invention and their relation to the blocks of the computer system shown in FIG. 1.
Figure 2:
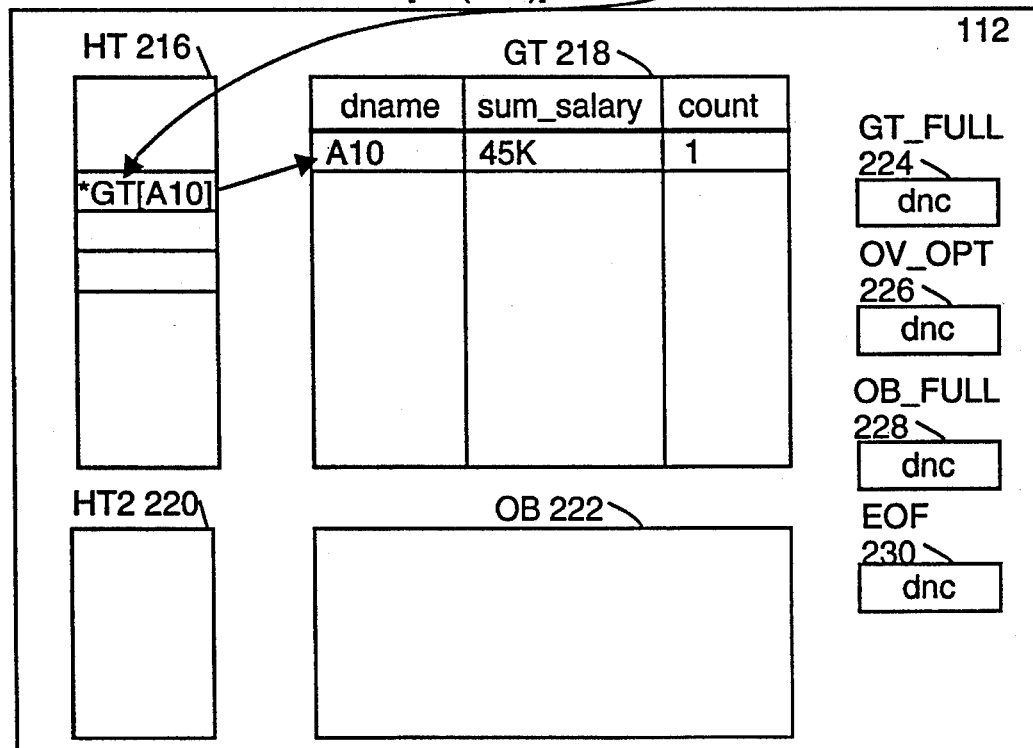

Referring to FIG. 2, there are shown the data structures and tables that are employed by the present hash grouping procedure. All of the elements shown reside in the Database/File Server 102 from FIG. 1. A hash function HF 210 and the grouping function GF 124a of the present invention are executed in the CPU 110. A database table T1 212 and an overflow file T2 214 are provided in the secondary memory 116. Data structures employed during execution of the present grouping method are maintained in primary memory 112 and include a hash table HT 216, a group table GT 218, a second hash table HT2 220, an output buffer OB 222, and several flags, including a group table full flag GT_FULL 224, an overflow option flag OV_OPT 226, an output buffer full flag OB_FULL 228, and an end of file flag EOF 230.

Hash Grouping Function

The grouping function GF 124a, which performs the present hash grouping method, is stored in the secondary memory 116 as part of the SQL executor 124, as is the hash function HF 210. When a user issues a SQL group-by query via the communications interface 114, the grouping function GF 124a and the hash function HF 210 are loaded into the primary memory 112 and executed in the CPU 110. While executing the group query, the grouping function GF 124a coordinates data transfers among the secondary memory 116, primary memory 112 and communications interface 114, through which the DBMS is able to communicate with the user workstations 104, 106. More specifically, the grouping function GF 124a operates on raw data stored in one or more database tables T1 212 (shown here as a single table) and overflow data stored in the overflow file T2 214, which are provided in the secondary memory 116. The Grouping Function GF 124a also controls all data transfer operations to and from the group table GT 218, hash table HT 216, second hash table HT2 220, output buffer OB 222, and flags GT_FULL 224, OV_OPT 226, OB_FULL 228 and EOF 230.

Tables T1 and T2

The database table T1 212 maintained in secondary memory 116 is made available for user SQL queries via the communications interface 114 and provides the raw data initially processed by the grouping function GF 124a in the course of executing a SQL group-by query. The raw data in table T1 212 is structured into rows and columns. A SQL group-by query such the one set out above designates selected columns SC 250 to be processed. At least one of the selected columns SC 250 is designated as a group column GC 252. The remaining (zero or more) selected columns SC 250 are data columns DC 254, which provide the member data to be grouped or aggregated.

The overflow table T2 214 is also provided in secondary memory 116 and serves as a database of sorts, but is not made available for user SQL queries. Rather, the table T2 214 occupies whatever disk space is available at the time the group-by query is being executed and provides temporary storage for database records (raw or partially processed) that have been read from T1 212 but not immediately grouped due to a lack of room in the group table GT 218. The overflow table T2 214 is written by the grouping function GF 124a resident in the CPU 110, and, once the entire database table T1 212 has been read, provides the input to the grouping function GF 124a for the final steps of the present grouping method.

As should be obvious to a person skilled in the art, in addition to being stored locally to the Server 102, the database tables 116 (including the database table T1 212 and overflow file T2 214) could be distributed over several slave processors (not shown) that communicate with the Server 102 via the network 108 and communications interface 114. However, as the method of storing the tables T1 212 is largely transparent to the hash grouping process, except where explicitly noted, the remainder of this description will presume database tables T1 212 and T2 214 stored within the Database Server 102.

Memory-Resident Data Structures

The group table GT 218 is a data structure maintained in the primary memory 112, which, in conjunction with the hash table HT 216, provides the chief advantages of the present invention. The group table GT 218 consists of a number of group table entries, each summarizing aggregated database data for a single group. Note that a group can correspond to a value from a single group column or to a combination of values from multiple group columns. What is meant by "summarizing" depends on the particular grouping query being executed in the DBMS. If a user queried the DBMS for the maximum and minimum salaries for each department represented in the employee database, each group table entry would include min and max data fields in which the current minimum and maximum are retained as well as a department name field. A query might be for all of the unique names in each department, in which case group table entries would again include a department name field and a list of unique employee names associated with the department. For an important class of queries, a user might wish to discover only the distinct values taken by members of the group columns, in which case the group table entries would include only group data, no data columns being selected by the user. For example, in the query "select dname from emp group by dname," the group table would comprise unique department names from the employee ("emp") table, the group column "dname" being the sole column selected by the query.

Finally, in the example discussed in the Background of the Invention, where the query sought a report of average department salaries, each group table entry would include, in addition to a department name field, a sum_salary field in which salaries are accumulated and a count field representing the number of rows accumulated into the sum_salary field. The count field is a housekeeping field, which is a field that does not correspond to any of the select columns SC 250 in the input table T1 212, provided in the group table so that the grouping function GF 124a can compute the aggregate function (e.g., "avg(salary)") requested in the group by query. A group table entry corresponding to this example is shown in FIG. 2. In that example, as the input database table T1 212 is read row by row, the group table entry corresponding to the new row's group identifier is located, the raw salary data accumulated into the corresponding group table entry's sum_salary field and the count field incremented. When the end of the input table T1 212 is reached, the average salary for each group (or department) can be computed by dividing the contents of the sum_salary field by the contents of the count field.

In FIG. 2, the group table GT 218 is shown as a table; however, the group table GT 218 can also be organized as a linked list or any other appropriate data structure. The largest possible size of the Group Table is determined by the number of unique values of the group columns GC 252. For example, given a table T1 212 with one million rows, the group table GT 218 could have as many as 1 million entries (if every row of T1 212 was associated with a unique group) or as few as, say, 100 (if only 100 different department names were represented in the group column GC 252). In contrast, in sort-based grouping, regardless of the number of groups, a sorted file of 1 million rows is always produced. This reveals one of the chief advantages of hash grouping: by aggregating group data as it is read from the database table, it is possible for the present grouping function to perform the entire, or most of the, grouping query in the memory 112. Of course, the effectiveness of hash grouping depends on the amount of memory that can be allocated for the group table GT 218 relative to the number of unique groups in the table T1 212—an excessively small group table requires the grouping function GF 124a to deal with overflow rows from the table T1 212 that can't be accommodated in memory 112. But, where appropriate, memory-based hash grouping provides measurable performance increases over the disk-based prior art.

Table 2 shows performance numbers from a side-by-side comparison of sort-based and hash-based grouping methods. These numbers do not represent the performance of the present grouping function in an overflow situation. However, based on a review of expected groups from some database benchmarks (TPC, Wisconsin), most of the time the percentage of groups is small compared to the number of rows in the tables. Consequently, the overflow case is more the exception than the rule.

Hash Function

The use of hash functions and hash tables is well known. In the present invention, the hash function HF 210 is defined so as to transform group identifiers (the set of unique values of the group columns GC 252) of table T1 212 to a (hopefully, unique) hash table HT 216 index. Each non-empty row of the hash table HT 216 holds the address of a group table entry that contains aggregated or grouped raw data associated with a single group identifier. There is at most one entry in the group table GT 218 corresponding to a unique value of the group columns GC 252. However, given the uncertainties of hashing techniques, it is likely that more than one group identifier will be mapped by the hash function into the same hash table entry. When this occurs, any of the well-known methods for resolving hash table conflicts would be applicable.

The memory flags GT_FULL 224, OV_OPT 226, OB_FULL 228 and EOF 230 signal the occurrence of conditions to which the present hash grouping function is responsive. The group table full flag GT_FULL 224 is a boolean that indicates, when set to logical 1, that no additional group entries can be allocated from primary memory 112. When this flag is set, the grouping function GF 124a accommodates new group data according to the overflow strategy that is indicated by the OV_OPT 226 variable. This variable can be set to 1, 2, or 3, indicating respectively that the first, second, or third overflow option has been selected by the user. The output buffer full flag OB_FULL 228 is a boolean that indicates when set that the output buffer is full. When set, this flag triggers the grouping function GF 124a to write the contents of the output buffer to the overflow disk file T2 214. The end of file flag EOF 230 is a boolean that indicates when set that the last record from the table T1 212 has been read, at which point the group function reports to the communications interface 114 all group data aggregated in the group table GT 218, clears the group table GT 218, and begins processing overflow records, if any, being maintained in the overflow disk file T2 214.

Note that the table T1 212 may be an intermediate table produced by a table join that occurs as part of a group with join SQL query such as:

select dname, avg(salary)

from dept, emp where dept.dno=emp.dno group by dname.

In this statement, instead of being in the same file, the department name and salary columns are respectively in a department ("dept") and an employee ("emp") table. The grouping function is executed on the intermediate table resulting from joining the two tables on their common department number ("dno") column.

FIG. 2 shows how the data structures and tables described above interact during execution of the average department salary example discussed above and set out immediately below:

select dname, avg(salary)

from emp group by dname.

Table T1 212 is the "emp" or employee file that is designated in the "from" part of the SQL group-by query shown above. For the purposes of this and all other discussions of the data structures, it will be assumed that the table T1 212 contains one million rows and multiple columns. Of these columns, two ("dname" and "salary") have been selected as subjects of the group-by query. Of these two columns, "dname" has been designated in the "group by" part of the query as the grouping column GC 252. This means that the number of reported groupings will be determined by the number of unique values (or department names) taken by the elements of the "dname" column. For the purposes of these discussions, it will be assumed that there are 1000 unique department names. Typically, a grouping query asks for some operation to be performed on the other selected columns, the data columns (here, "salary"). In this example, the aggregation operation to be executed on the one data column is "average(salary)," which requires the grouping function to average the salaries of all employees belonging to a department. The "eno" or employee number column in the table T1 212 was not selected for grouping.

The present grouping function executes this query, and all other grouping queries by processing the employee table T1 212 one row at a time. FIG. 2 shows the stale of the data structures*after the first row (eno=1, dname=A10, salary=45K, . . . ) has been processed. In this and remaining discussions, the terms "column and "field" will be used frequently. "Column" is used to refer to a column vector within a database table; e.g., the dname column of the table T1 212 comprises the elements "A10, . . . , A10, K15, B30, . . . , M26). The term "field" identifies an element of a table row where the field is an element of the column vector of the same name; e.g., the first row of the table T1 212 has a dname field of A10, which is included in the dname column.

After the first row is read, the grounding function applies the hash function HF 210 to the group identifier (i.e., "A10") associated with the first row. The resulting hashed group value (HF(A10)) serves as an index to an entry (HT [HF(A10)]) of the hash table HT 216, the contents of which contain the address (*GT[A10]) of the group table entry (if one exists) in which data for group A10 is being aggregated.

The hash table HT 216 is checked to determine whether data associated with the just read group identifier is represented in the group table GT 218. In FIG. 2, the check against the hash table entry (HT[HF(A10)]) shows that no data for group "A10" is represented in the group table GT 218. Consequently, a new group table entry (designated in FIG. 2 as "GT[A10]") is allocated for group "A10," and the contents of the indexed hash table entry (HT[HF(A10)]) are set to point to the new group table entry (designated in FIG. 2 as *GT[A10], where the "*" indicates a pointer to the data structure element listed to the right of the "*"). Before going on to read the next row of the table T1 212, the grouping function GF 124a writes the group identifier ("A10") and salary ("45K") from the current row to the dname and sum_salary fields of the new group table entry and sets the count field of the group table entry to "1". At this point, the flags, second hash table HT2 220 and output buffer have not come into play; consequently, the flags are shown as "dnc," meaning "do not care" and the second hash table HT2 220, the output buffer OB 222 and the overflow file T1 212 are shown blanked out.

The Hash-Based Grouping Procedure

Basic Flow Diagram

Figure 3:
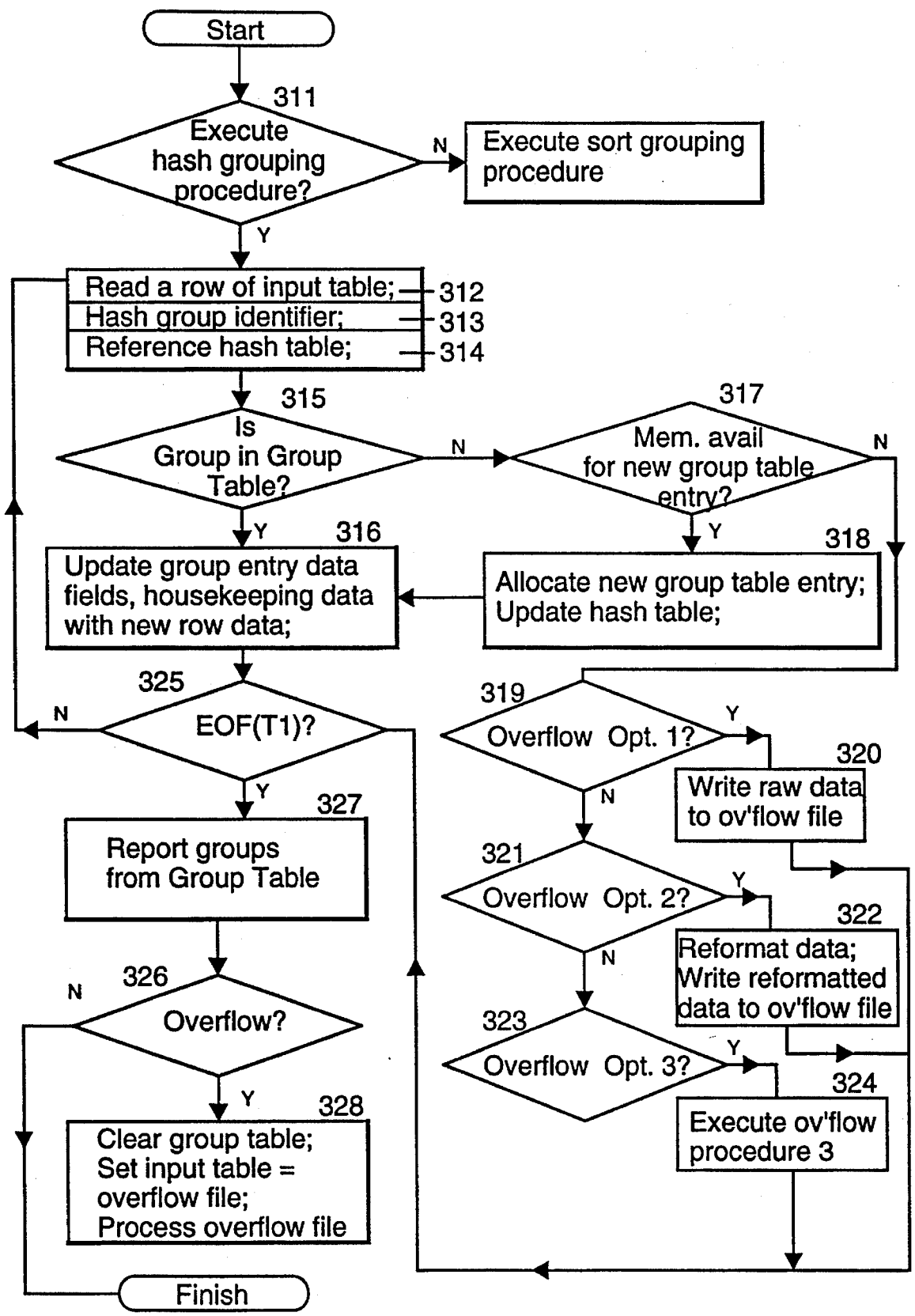
FIG. 3 is a flow diagram showing the steps of the hash grouping method of the present invention.

FIG. 3 shows a flowchart summarizing the steps of the hash grouping method performed by the grouping function GF 124a of the present invention. These steps, including details of the three overflow procedures, are described in pseudocode in Table 1.

The first step (311) is for the front end procedure 244 to determine, based on statistics maintained by the catalog 126 on the database table T1 212 and the amount of primary memory 112 available for the group table GT 218, whether the current sort-based grouping method or the hash-based grouping method of the present invention should be used. When the catalog 126 for the database table T1 212 shows that the number of groups (i.e., the unique values represented in the designated group columns) would require a group table GT 218 far larger than available memory resources (including the output buffer OB 222 and free space in the primary memory 112) would allow, the grouping function GF 124a executes the prior art sort grouping method, which does not use memory space to maintain partial results (311 - N). Where group data for the number of groups identified by the catalog 126 would not far exceed the largest-possible size of the group table GT 218, the grouping function GF 124a executes the disclosed hash grouping method (311 - Y). The statistical computations alluded to are not described in greater detail herein as these kinds of computations are well known in conjunction with relational database procedures.

Once hash grouping has been selected, the next step (312) is for the input procedure 232 to read selected fields (corresponding to the selected columns from the SQL grouping/aggregation query) of a single row of the database table T1 212. The hash function HF 210 is then applied by the matching procedure 234 to the group identifier associated with the just read row, yielding a hashed group value that serves as an index into the hash table HT 216 (3 13). If the indexed entry of the hash table HT 216 points to an entry in the group table GT 218 summarizing selected data fields from the same group (315 - Y), the just read raw data are aggregated into that group entry (316) by the aggregation procedure 236. If the indexed entry of the hash table HT 216 does not point to such an entry in the group table GT 218 (315 - N), steps 317–324 are executed depending on the availability of space in the group table GT 218 and the selected overflow option.

Additional details of the aggregation step (316) are not shown in FIG. 3, as those details mostly depend on the aggregate function specified by the user in the group by query. However, for all aggregate functions, the grouping function's aggregation procedure 236 is required to update data fields and, possibly, housekeeping data maintained in the group table for each group being aggregated therein. For example, if the aggregate function were "sum(salary)," the aggregation step (316) would require the grouping function GF 124a to simply accumulate the just read salary into the appropriate group entry's "sum_salary" field (e.g., sum_salary=sum_salary+salary). In this example, there are no housekeeping data to update as no additional variables are required to compute the aggregate function. However, in the "avg(salary)" example, in addition to accumulating "sum_salary" as above, a group entry's housekeeping data ("count") is incremented (e.g., count=count+1) for each accumulated group salary. This allows "avg(salary)" to be reported as "sum_salary"/"count" once all entries of the input table T1 212 have been read.

If space is still available in primary memory 112 (317 - Y) as determined by preset memory availability criteria, a new group table entry is allocated (318) and initialized with selected fields from the new row data (316) by the initialization procedure 238. Note that, with the present grouping function, a group table entry is structured differently from a row from the table T1 212; this is because the point of a SQL grouping query is to perform a computation on group member data. For example, in the average salary query set out above, a group table entry would need to maintain three fields for each group (dname, sum_salary, and count) compared to the two fields (dname and salary) selected from the perhaps dozens of columns of the table T1 212. Consequently, the initialization of the new group table entry depends on the aggregation operation to be executed. Once a new group table entry is allocated and initialized, a pointer to the new group table entry is set in the hash table HT 216 at the location indexed by the hashed group value (318). If that hashed group value duplicates that of another group identifier, the conflict in the hash table is resolved according to any of several well-known techniques.

Figure 5A:
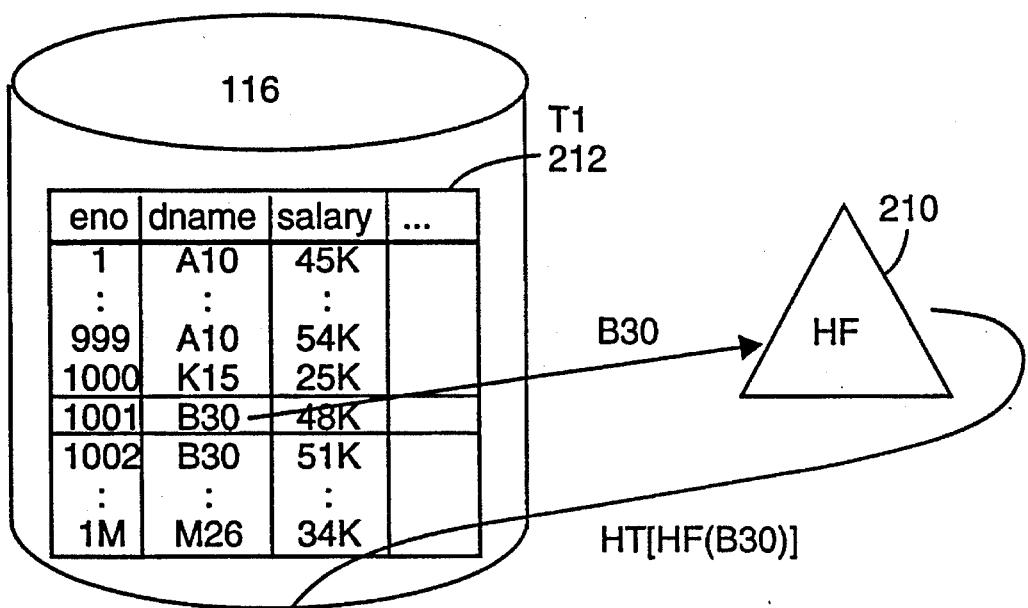
FIGS. 5A–5C are block diagrams showing the interactions of tables and memory-resident data structures during the execution of a first overflow procedure of the present invention.
Figure 5A:
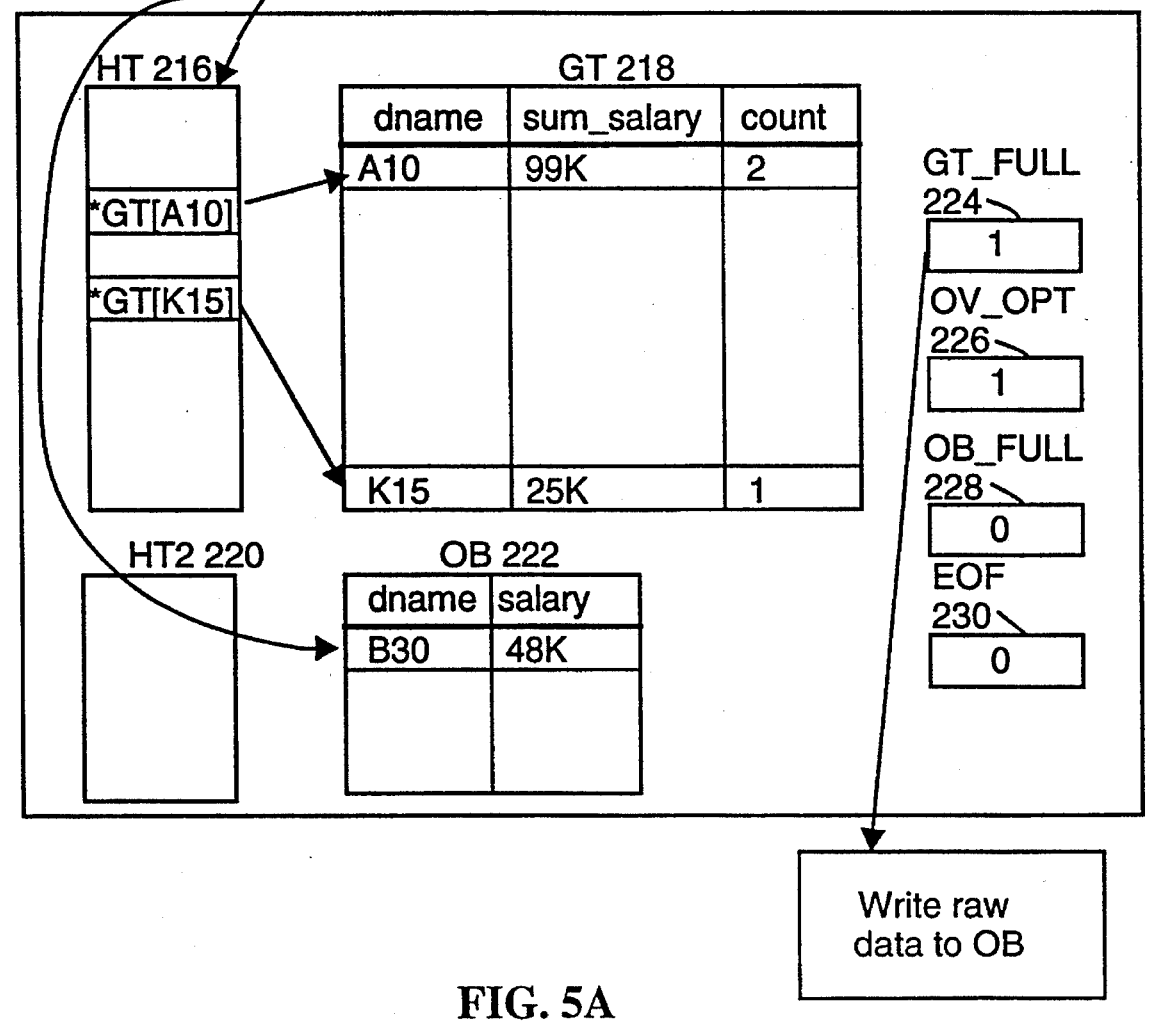
Figure 5B:
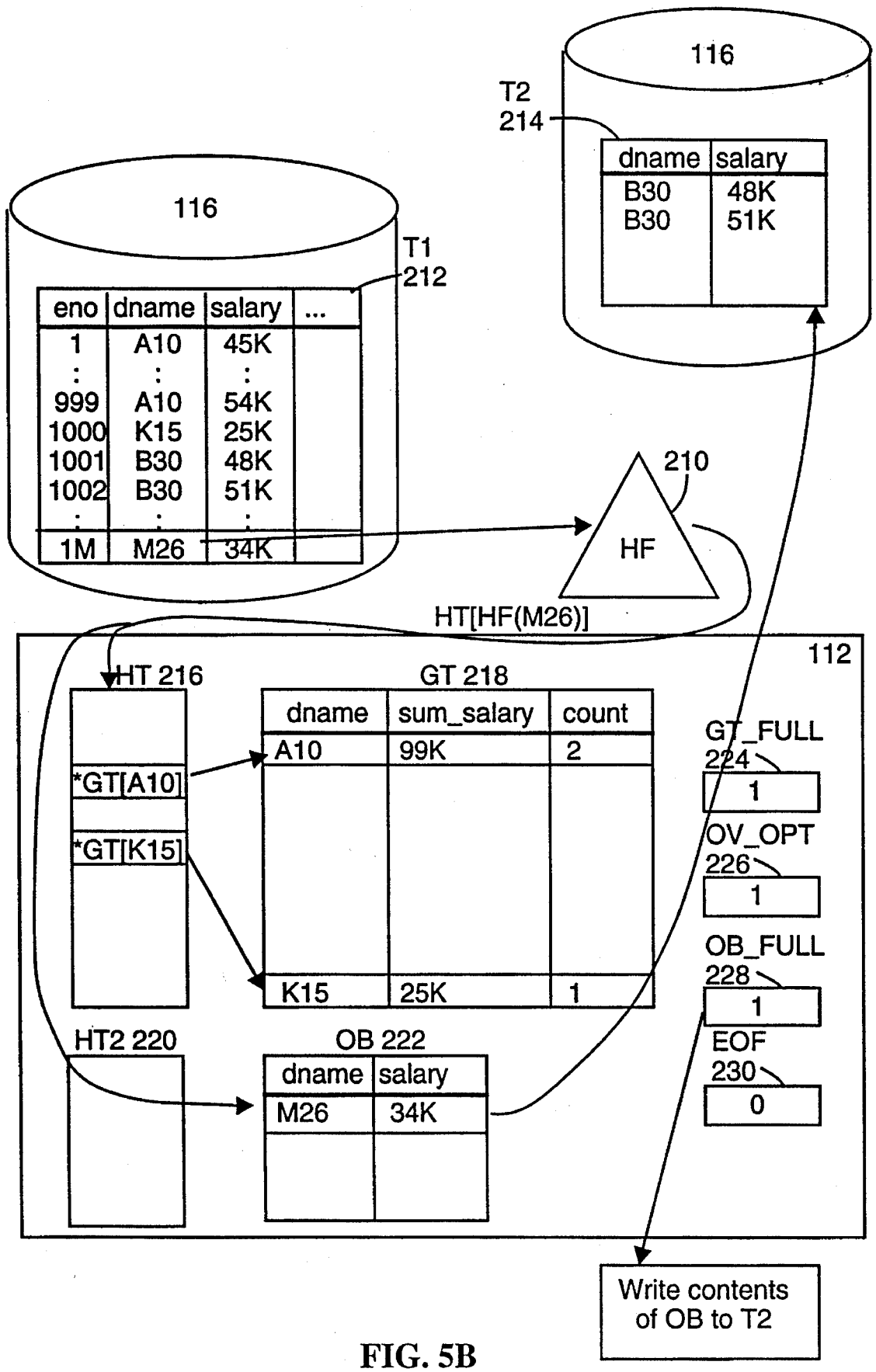
Figure 5C:
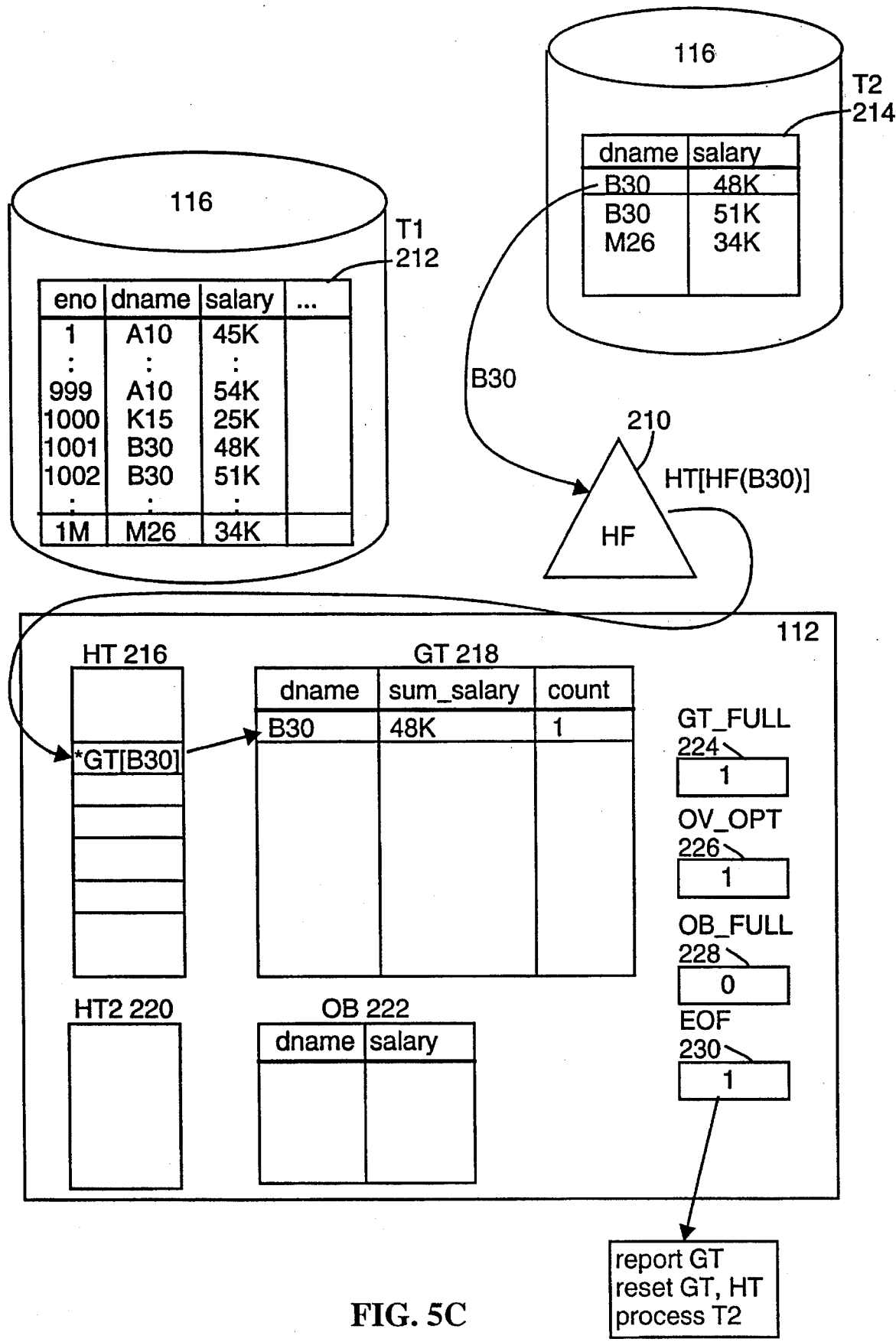
Figure 6:
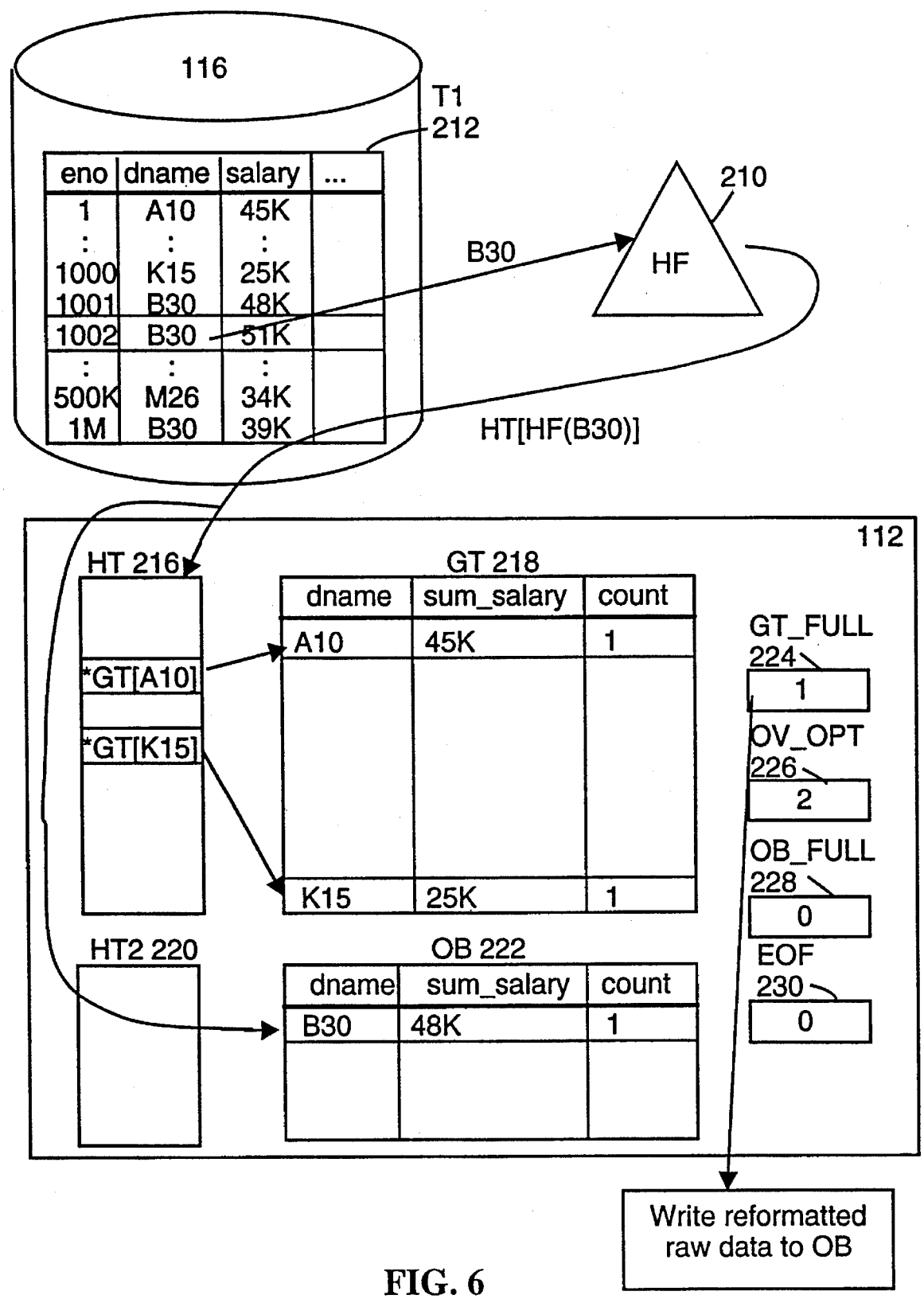
FIG. 6 is a block diagram showing the interactions of tables and memory-resident data structures during the execution of a second overflow procedure of the present invention.

If no memory is available for a new group table entry (317 - N), the present invention provides several overflow procedures 240 for processing raw data from groups for which partially aggregated data cannot be maintained in the group table GT 218. If the first overflow option has been selected (319 - Y), the selected fields of the row just read are written to an output buffer OB 222, which, when full, is flushed to the overflow file T2 214 (320). Data structure-oriented illustrations of this option are shown in FIGS. 5A–5C, which are discussed below. If the second overflow option has been selected (321 - Y), the selected fields of the row just read are formatted like the group table entries and the formatted row is written to the output buffer OB 222, which, as above, is periodically flushed to the overflow file T2 214 (322). A data structure-oriented illustration of this option is shown in FIG. 6, which is discussed below. If the third overflow procedure is selected (323), steps of the third overflow procedure are executed by the grouping function (324). This procedure is more complex than the first and second procedures, and will be fully discussed below in reference to FIGS. 7 and 8.

Following the execution of one of the overflow procedures 240 (320, 322, 324), or the updating of an existing group table entry (316), the grouping function tests whether the last row of the input file T1 212 has been read (325). If the end of the table T1 212 has not been reached (325 - N), the input procedure 232 of the grouping function GF 124a begins processing the next row of the input table (312). If the end of the table T1 212 has been reached (325 - Y), the contents of the group table are reported (327) to the user via the communications interface 114. If it was not necessary to resort to an overflow procedure (326 - N) (i.e., all of the groups represented by the raw data in the database T1 212 were able to be aggregated/grouped in the group table GT 218), the process executive in the CPU terminates the grouping function.

If it was necessary to execute one of the overflow procedures (326 - Y), the group table GT 218 is emptied and the steps of the process outlined above are repeated with one exception: the data are now read by the overflow input procedure 242 from the overflow file T2 214 rather than the database table T1 212 (328). As the data in the overflow file T2 214 are formatted differently based on the selected overflow procedure, the first step of the hash-based grouping method (312) is able to accommodate different input formats depending on the selected overflow process. These differences should be apparent from the following detailed discussions of the three overflow procedures.

Basic Data Structures

Figure 4:
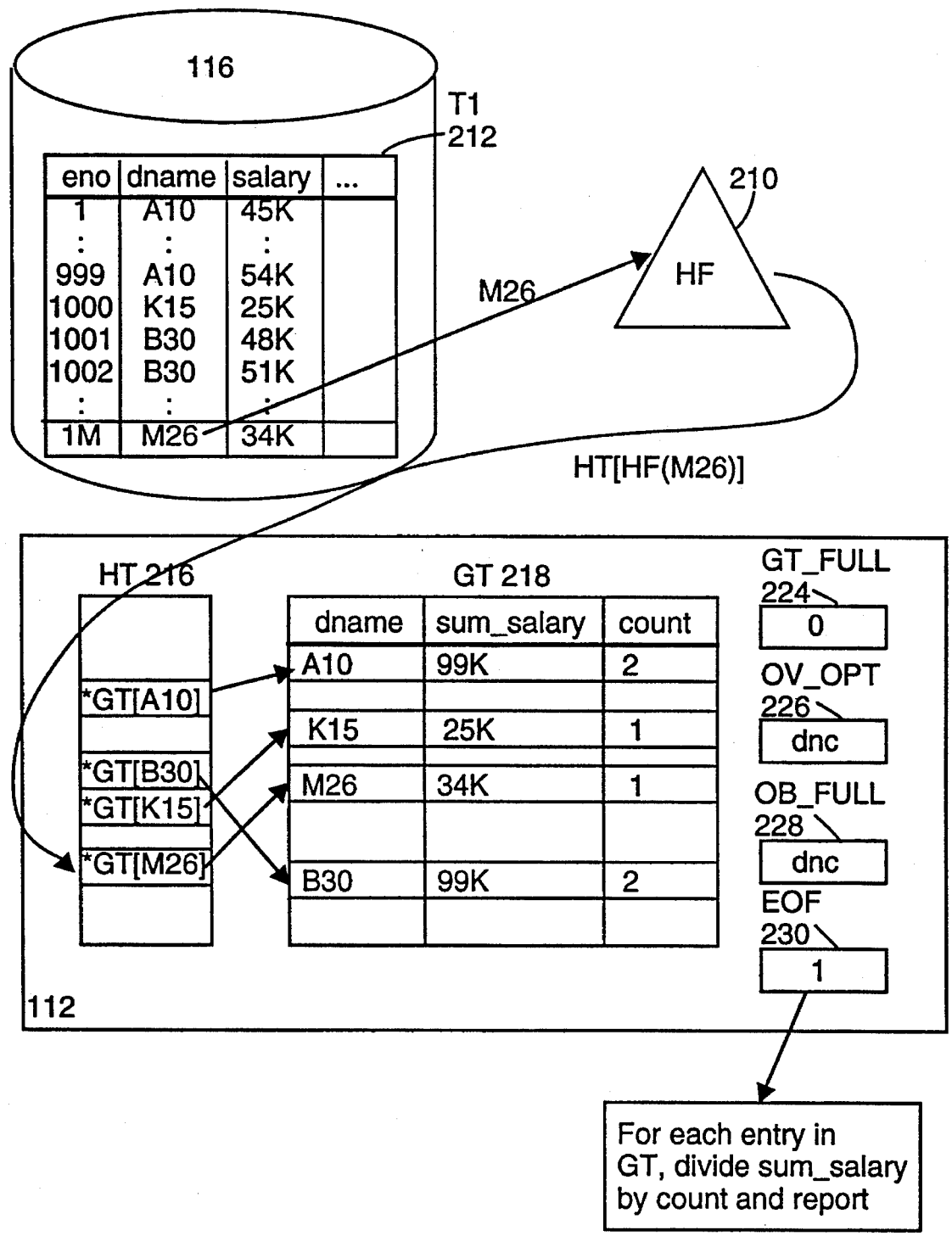
FIG. 4 is a block diagram that shows the interactions of tables and memory-resident data structures following execution of the hash grouping method of the present invention.

FIG. 4 illustrates the state of the data structures after all of the rows of the table T1 212 have been read in the situation where there has been no overflow processing (the group table full flag GT_FULL 224 is set to "0"). Note that the selected fields from the one million rows of T1 212 have been fully aggregated in the group table T1 212. Reflecting the raw data from the table T1 212 partially shown in FIG. 4, the group table GT 218 has summarized salary data for two members (rows) of groups A10 and K15, and for single members of groups B30 and M26.

Once the last row of employee table T1 212 is read, an end of file flag EOF 230 is set in memory 112, and for each entry in the group table GT 218, the average department salary is computed by dividing the contents of the "sum_salary" column by the contents of the "count" column. The groupings are then reported to the communications interface 114, where they are made accessible for display on the user workstation 104, 106. In some cases, the results are also retained on the server 102.

Overflow Strategies

FIG. 4 shows the idealized situation where the group table GT 218 can accommodate aggregates of all of the groups represented by the raw data from Table T1 212. However, in actual practice, it is possible that, before all of the raw data of table T1 212 have been read, the group table GT 218 will have been filled. This occurs when the number of groups represented by the raw data in the table T1 212 exceeds the number of groups which can be aggregated in the group table GT 218. When the group table GT 218 is full, and the row being processed belongs to a group that is not represented in the group table GT 218, an overflow condition results, meaning that the new raw data row cannot be processed as described in reference to FIG. 3.

When an overflow condition exists, the present invention provides three strategies for processing raw data belonging to groups not represented in the group table GT 218. As set out above, in the first overflow strategy, raw data which cannot be processed is written to an overflow file T2 214, the contents of which are processed as described above after each record in table T1 212 has been read. Also discussed above, in the second overflow strategy, raw data is reformatted to conform to the organization of the rows of the group table T2 214, then written to an overflow file T2 214, which is processed after the contents of table T1 212 have been read. Finally, in the third overflow strategy, not discussed above, the overflow data are partially aggregated using hashing in the output buffer OB 222 maintained in primary memory 112, the contents of which are flushed to the overflow file T2 214 once the buffer has filled up. The partially aggregated contents of the output buffer T2 214 are then processed by the overflow input procedure 242 after the database T1 212 has been entirely read. These three overflow procedures are illustrated in FIGS. 5A–C, and 6–8.

Overflow Procedure 1

Referring to FIGS. 5A–5C, there are shown the states of the databases and tables during execution of a SQL group query by the present grouping function.

FIG. 5A shows the situation where, after processing the individual rows of the table T1 212 up to and including the 1000th row (eno=1000, dname= K15, salary=25K), the grouping function GF 124a cannot allocate additional memory for new group table entries. This is indicated by the GT_FULL 224 flag being set to "1". When the next row (eno=1001, dname=B30, salary=48K) is read, the grouping function GF 124a references the hash table HT 216 at the index provided by the hashed group value (HF(B30)) to see whether data from group B30 are being aggregated in the group table GT 218. In this case, there is no match. As the GT_FULL 224 flag is set, the grouping function GF 124a does not attempt to allocate a new group table entry for group B30. Rather, as the output buffer is not yet full (indicated by the output buffer flag OB_FULL 228 being set ="0") the grouping function GF 124a writes the selected fields of the new row (dname=B30, salary=48K) to the output buffer OB 222.

FIG. 5B shows a snapshot of the data structures and tables after all but one of the rows of the table T1 212 have been read. As in FIG. 5A, the group table full flag GT_FULL 224 indicates that the group table is full and the overflow option flag OV_OPT 226 indicates that the first overflow procedure has been selected. The key difference from FIG. 5A is that the output buffer full flag OB_FULL 228 is set to "1", showing that the output buffer OB 222 is full. At this point, the last row (eno=1M, dname=M26, salary=34K) is read and the group table GT 218 is found to lack an entry aggregating data from group M26. However, as the output buffer full flag OB_FULL 228 is now set, before the new record can be written to the output buffer OB 222, the grouping function GF 124a must first flush the output buffer to the overflow file T2 214. As a result, the output buffer shown in FIG. 5B contains the selected fields (dname=M26, salary=34K) from the most recently read row, while the overflow file T2 214 holds the selected data from the previously-read overflow rows.

In FIG. 5C, the end of file flag EOF 230 is set to "1", indicating that all of the rows of the table T1 212 have been processed. Consequently, the grouping function GF 124a reports the contents of the group table GT 218, which represent fully aggregated groups (i.e., final averages). However, because not all of the groups from the table T1 212 could be aggregated in the group table GT 218, data from overflow rows exist in an overflow file T2 214. After the group table GT 218 results are reported, the grouping function GF 124a resets the group table GT 218 and the group_table full flag GT_FULL 224 and proceeds to process row-by-row the raw data stored in the overflow table T2 214. In FIG. 5C, the first row (dname=B30, salary=34K) of the overflow file T2 214 is being processed; as a result, a new entry is allocated in the group table GT 218 summarizing that row. Apart from the format of the overflow file T2 214 differing from the input table T1 212, the grouping function GF 124a processes the overflow file T2 214 identically to the data from the input table T1 212.

Overflow Procedure 2

Referring to FIG. 6, the states of the databases and tables are shown during execution of a SQL group-by query by the present grouping function when the second overflow option has been selected (indicated by the overflow option variable OV_OPT 226 being set="2").

The state shown in FIG. 6 is substantially identical to that shown in FIG. 5A, except, instead of writing the raw selected data to the output buffer OB 22 (e.g., dname=B30, salary=48K), the grouping function GF 124a writes the data to the output buffer only after reformatting it like a group table entry (e.g., dname=B30, sum_salary=48K, count=1). This reformatting allows overflow data to be more easily aggregated when the grouping function processes the overflow file T2 214.

Overflow Procedure 3: Flow Diagram

Figure 7:
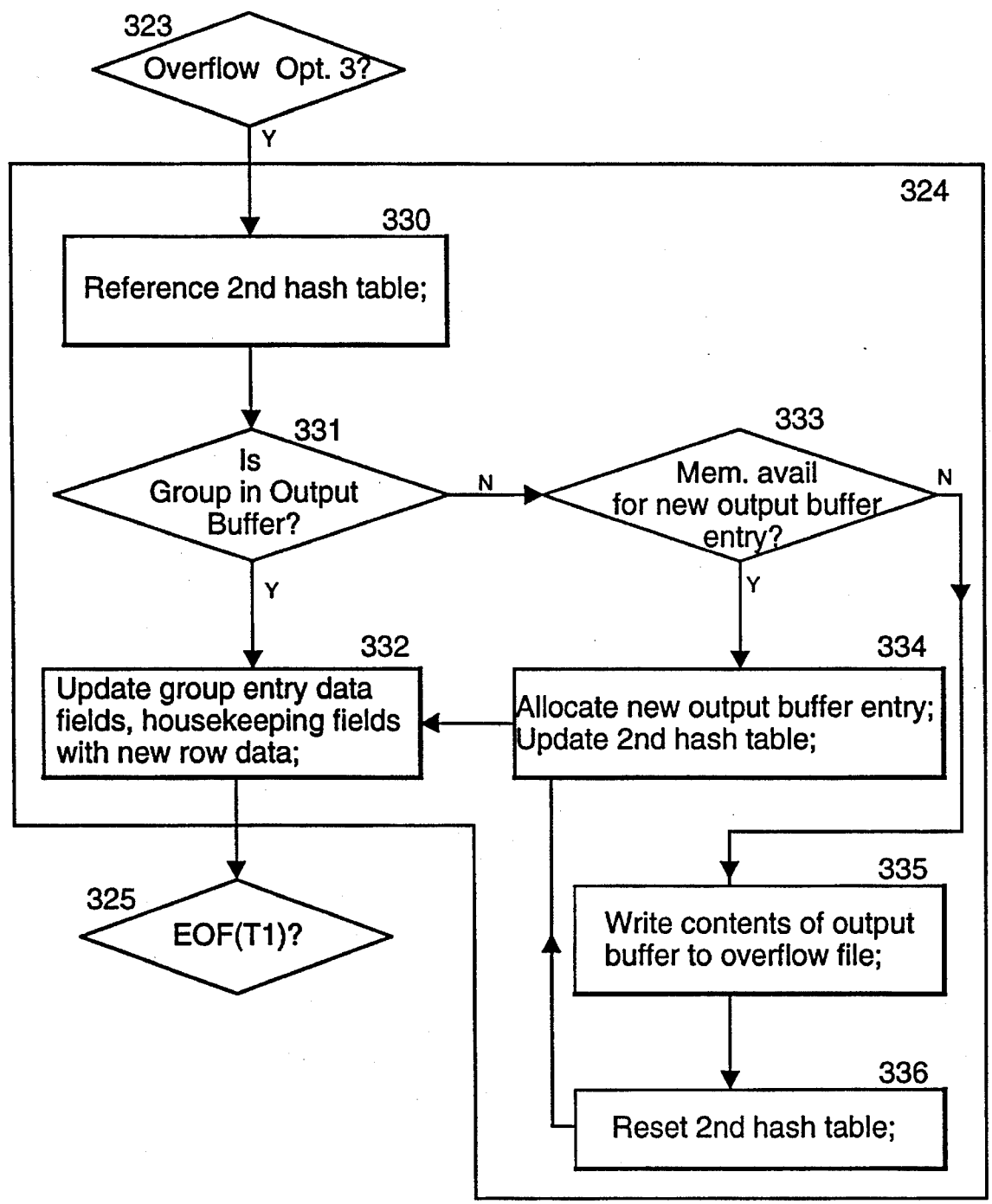
FIG. 7 is a flow diagram showing the steps of a third overflow procedure of the present invention.

Referring to FIG. 7, a flow diagram shows the steps of the third overflow procedure, which is selected when the overflow option flag OV_OPT 226 is set to "3". This procedure is far more complex than the first and second overflow procedures, but, as will be seen from the accompanying description, this complexity confers many advantages. The steps of the third procedure discussed below compose step 324 of the grouping function flow diagram shown in FIG. 3.

If the group comprising the row just read is not represented in the group table GT 218 (315 - N), there is no available memory (GT_FULL 224=Y) from which to allocate a new group entry (317 - N), and the user has selected the third overflow option (OV_OPT 226=3) (323 - Y) the grouping function GF 124a processes the new row according to the third overflow procedure (324).

As the first step of the third overflow procedure (330), the matching procedure 234 of the grouping function GF 124a references the second hash table HT2 220 at an index provided by the hashed group value from step 313 to see whether members of that group are represented in the output buffer OB 222. If there is a match (331 - Y), the new data is aggregated in the output buffer by the aggregation procedure 236 in much the same way as if it were being aggregated into the group table GT 218 (332).

If there is no match (331 - N), the grouping function GF 124a checks the output buffer to see whether there is room to begin partially aggregating data for a new group therein (333).

If there is enough room (333 - Y), the initialization procedure 238 of the grouping function GF 124a allocates space in the output buffer OB 222 for the new group data (334), sets the contents of the second hash table HT2 220 entry indexed by the hashed group value to the address of the newly allocated output buffer entry (334), and writes the selected data to the appropriate fields of the output buffer entry, which is formatted identically to a group table entry (332). In this way, partial aggregation can be efficiently performed via hash lookup techniques in the output buffer in the same way as in the group table GT 218.

If there is not enough room in the output buffer OB 222 (333 - N), the grouping function GF 124a writes the contents of the output buffer OB 222 to the overflow file T2 214 (335) and resets the second hash table HT2 220 (336), freeing up the entire output buffer OB 222 for new data from the table T1 212. Once step 336 is completed, the third overflow procedure continues from step 334 as described above. Following the completion of step 332, the grouping method resumes at step 325 of FIG. 3.

As with the other overflow procedures, once all the rows of T1 212 have been read, the overflow file T2 214 is processed row by row by the overflow input procedure 242.

The only real difference between the functions of the output buffer in the third overflow procedure and the group table GT 218 is that entire groups are aggregated in the group table GT 218; whereas partially aggregated groups in the output buffer OB 222 are dumped to an overflow file T2 214 whenever the output buffer OB 222 fills up and a new output buffer entry needs to be allocated. However, the fact that this procedure allows partial groups to be maintained in the overflow file means that fewer overflow file records (and in some cases far fewer records) need to be processed by the grouping function GF 124a after the input table T1 212 has been completely read.

For example, assume that the table T1 212 comprises 1 million rows from 1000 groups, that the group table GT 218 could accommodate only 500 groups and that a user executes the average salary query presented above. Under the first overflow option, the overflow file T2 214 would, on average, be expected to comprise 500,000 rows of raw data belonging to the 500 groups which could not be aggregated in the group table GT 218. The same result would apply in the second overflow procedure except the rows of the overflow file would be formatted like group table entries to facilitate aggregation in the group table GT 218 during the second pass through the data. In contrast, in the third overflow procedure, depending on how many groups could be maintained in the output buffer OB 222, the overflow file T2 214 might contain as few as 500 group entries. Of course, the number of entries in the file T2 214 depends on the number of groups represented by the data in the table T1 212 as well as the size of the output buffer OB 222, but the third procedure will yield increases in efficiency in executing group-by queries where the data allows. In a preferred embodiment of the present invention, the front end procedure recommends an overflow procedure based on available memory and the number of groups in the table T1 212.

Overflow Option 3: Data Structures

Figure 8:
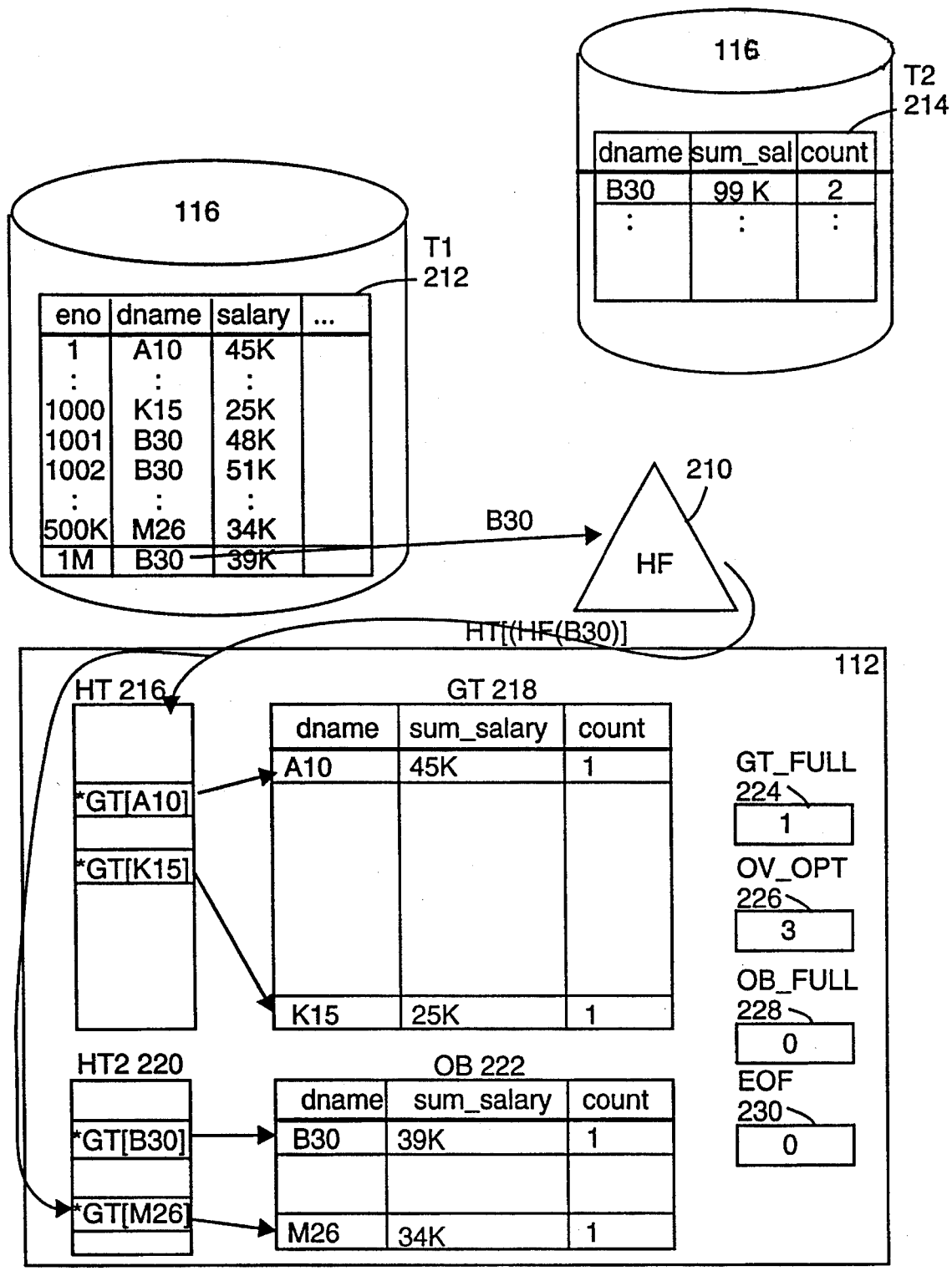
FIG. 8 is a block diagram showing the interactions of tables and memory-resident data structures during the execution of the third overflow procedure of the present invention.

Referring to FIG. 8, there is shown the state of the databases and tables during execution of a SQL group-by query by the present grouping function. At this point in processing, all but one of the rows (eno=1M, dname=B30, salary= 39K) of the database table T1 212 have been processed. The overflow option flag is set to "3", showing that the third overflow procedure has been selected. The memory full flag is set to "1", indicating that no more groups can be accommodated in the group table. The output buffer full flag OB_FULL 228 is set to "0", indicating that there is room in the output buffer OB 222 for new group data. The end of file flag EOF 230 is "0" showing that the table T1 212 has not yet been completely read.

At this point, the grouping function GF 124a first reads the last row of the table T1 212. As with any other row, the hash function is applied to the group identifier (dname= B30), a hashed group value is generated (HF(B30)), and the hash table is referenced at that index (HT[HF(B30)]) to see whether data for group B30 exists in the group table. In this case, there is no match in the hash table. Consequently, the grouping function GF 124a uses the same hashed group value and lookup techniques to see whether data from group B30 are being partially aggregated in the second hash table HT2 220. Here, even though two other rows from group B30 have been previously aggregated in the output buffer OB 222, the partially aggregated data have been previously written to the overflow file T2 214, probably to accommodate data from a new group (e.g., dname="M26"). Thus, there is no entry in the second hash table HT2 220 corresponding to the group value B30. In keeping with the procedure described above, the grouping function GF 124a responds to this set of circumstances by writing the reformatted row (dname=B30, sum_salary=39K, count=1) to the output buffer OB 222 and setting a pointer in the indexed hash table entry (HT2[HF(B30)]) to that buffer entry.

When the present grouping function GF 124a is executed on a partitioned database table, the steps outlined above are performed in parallel on the partitions, then the grouping function GF 124a aggregates the results from the partitions.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Grouping Function

User Enters Group Query causing Execution of Grouping Function. User Query
  specifies Input Table (T1), Select Columns including Group Columns and Data
  Columns, and an Aggregation/Grouping Function to be applied to the member
  data
{
  While not EOF(T1)
  {
  Read next row of T1;
  Set HashTable_index = HashFunction(row.group)
  Set GroupTable_address = HashTable[HashTable_index]
  LABEL 100
   If ((GroupTable_address ≠ 0) AND
     (GroupTable[GroupTable_address].group = row.group))
     {
     Update GroupTable[GroupTable_address].data with row.data
     Update GroupTable[GroupTable_address].housekeep_data
     }
   Else If (GroupTable_address ≠ 0) AND
     (GroupTable[GroupTable_address].group ≠ row.group)
     {
     Resolve HashTable conflict
     If existing group, Execute Label 100
     If new group, Execute Label 200
     }
  LABEL 200
   Else If (GroupTable_address = 0)
     {
     If (GroupTable_FULL = N)
       {
       Allocate new_GroupTable_entry
       Set HashTable[HashTable_index] =
       Addr(new_GroupTable_entry)
       Set new_GroupTable_entry.data = row.data
       Initialize new_GroupTable_entry.housekeep_data
       }
     Else If (GroupTable_FULL = Y)
       {
       If (OV_OPT = 1)
         {
         If (OutputBuffer_FULL = Y)
           Write OutputBuffer to Overflow file T2
         Write row.select_data to OutputBuffer
         }
       Else If (OV_OPT = 2)
         {
         If (OutputBuffer_FULL = Y)
           Write OutputBuffer to Overflow file T2
         Reformat row.select_data
         Write reformatted row.select_data to OutputBuffer
         }
       Else If (OV_OPT = 3)

TABLE 1-continued

Pseudocode Representation of Grouping Function

```
  {
  Set HashTable2_index = HashFunction(row.group)
  Set OutputBuffer_address =
    HashTable2[HashTable2_index]
LABEL 300
  If ((OutputBuffer_address ≠ 0) AND
    (OutputBuffer[OutputBuffer_address].group = row.group))
    {
    Update OutputBuffer[OutputBuffer_address].data with
      row.data
    Update
    OutputBuffer[OutputBuffer_address].housekeep_data
    }
  Else If (OutputBuffer_address ≠ 0) AND
    (OutputBuffer[OutputBuffer_address].ID ≠ group value)
    {
    Resolve HashTable conflict
    If existing group, Execute Label 300
    If new group, Execute Label 400
    }
LABEL 400
  Else If (OutputBuffer_address = 0)
    {
    If (OutputBuffer_FULL = Y)
      Write OutputBuffer to Overflow file T2
    Allocate new _OutputBuffer_entry
    Set HashTable2[HashTable_index] =
      addr(new_Output _Buffer_entry)
    Set new_OutputBuffer.data = row.data
    Initialize new_OutputBuffer.housekeep_data
    }/* endif Label 400 */
   }/* endif overflow option 3 */
  }/* endif overflow processing */
 }/* endif no match in group table */
}/* endif while !EOF(T1) */
Report group table contents to the user
If an overflow option was executed, flush the output buffer to T2, clear the group
table, set the input file to T2 and start over
} /* end of grouping function */
```

TABLE 2

The Wisconsin tables were used to generate the following performance numbers. These numbers do not represent any overflow case. The query executed to obtain the following numbers was:
  INSERT INTO TEMP SELECT SUM(column), column from
  WISCTAB GROUP BY column.
Different columns from the Wisconsin (WISCTAB) table were used to form the different number of groups. For example, the column TWO in the Wisconsin table partitions the table into two groups.
The following four column table summarizes the performance numbers. The first column lists the number of groups represented by the data in the group column and the corresponding percentage of groups calculated with respect to the number of rows (all of the simulations were run on a table with 7500 rows). The second and third columns show the elapsed time in seconds required to complete the sort grouping and hash grouping operations respectively. The final column shows the relative improvement provided by hash grouping with respect to sort grouping.

| No. of Groups | Parallel repartitioned aggregates (min:sec) | Parallel hashed aggregates (min:sec) | Improvement |
| --- | --- | --- | --- |
| 2 (0.2%) | 5:34 | 3:24 | 64% |
| 10 (0.1%) | 5:34 | 3:23 | 64% |
| 750 (1%) | 5:32 | 3:25 | 62% |
| 7500 (10%) | 5:45 | 3:45 | 53% |
| 37500 (50%) | 6:56 | 4:58 | 40% |
| 75000 (100%) | 8:25 | 6:38 | 27% |

TABLE 2-continued

Note that in all cases there is a performance gain due to hash grouping. This performance gain increases as the number of groups decrease. Where there are a small number of groups, the performance gain remains constant and high.

What is claimed is:

1. A method for performing a hash grouping operation on a relational database table, said table comprising rows and columns, said columns including at least group column and zero or more data columns, said method comprising the steps of:

(1) reading a row of said relational database table, said row comprising a identifier from said at least one group column and zero or more data fields to said zero or more data columns;

(2) applying a hash function to said group identifier to generate a hashed group value, said hashed group value serving as an index into a memory-resident hash table, said hash table mapping hashed group values into corresponding memory-resident group table entries, each group table entry including group data fields that store for a single group aggregated raw data from said data fields, a group identifier and housekeeping data;

(3) determining from contents of said hash table whether a matching group table entry exists for a group defined by said group identifier;

(4) when said matching group table entry exists, aggregating contents of said data fields into corresponding group data fields of said group table entry and updating said housekeeping data;

(5) when said matching group table entry does not exist and available memory meets predefined memory availability criteria, allocating an additional group table entry, writing into said additional group table entry said group identifier and said data fields, and initializing said housekeeping data.

(6) when said matching group table entry does not exist and available memory does not meet said predefined memory availability criteria, applying an overflow procedure to said row wherein contents of said row are used to update an overflow file.

(7) repeating steps (1) through (6) until all rows of said table have been read;

(8) reporting said group table entries;

(9) when at least one of said rows were written to said overflow file, repeating steps (1) through (8), except in step (1) reading said overflow file rather than said relational database table.

2. The method of claim 1, wherein said overflow procedure includes the step of writing said row to said overflow file.

3. The method of claim 1, wherein said overflow procedure includes the steps of reformatting said row to conform to said group table row entry and writing said reformatted row to an overflow file.

4. The method of claim 1, wherein said overflow procedure includes the steps of:

(1) determining from contents of a second hash table whether a matching buffer entry corresponding to said hashed group identifier exists in a group output buffer; said buffer entries including buffer data fields, a buffer identifier and buffer housekeeping data corresponding to said group data fields, group identifier and group housekeeping data;

(2) when a matching buffer entry exists, aggregating contents of said data fields into said buffer data fields and updating said buffer housekeeping data of said matching buffer entry;

(3) when a matching buffer entry does not exist and said buffer is not yet full, writing according to said group table format a new buffer entry comprising said data fields and said group identifier, initializing said new entry's buffer housekeeping data and providing a pointer to said new buffer entry in said second hash table at a position indexed by said hashed group identifier.

(4) when a buffer entry corresponding to said hashed group value does not exist in said buffer and said buffer is full, appending contents of said buffer to a disk file, resetting said second hash table, writing according to said group table format a new buffer entry comprising said data fields and said group identifier, initializing said new entry's buffer housekeeping data and providing a pointer to said new buffer entry in said second hash table.

5. A database management system (DBMS) including:

(a) a secondary memory including a relational database table comprising rows and columns, said columns including at least one group column and zero or more data columns, an overflow file and compiled database routines, including a grouping function and a hash function;

(b) a primary memory including a group table and a hash table, said group table comprising a plurality of group table entries each storing for a single group aggregated member data, a group name and housekeeping data, and said hash table comprising a plurality of hash table entries each storing the address of a corresponding group table entry, said address being retrievable from said hash table at an index generated by applying said hash function to said group name of said corresponding group entry;

(c) a communications interface through which user database queries are relayed to said DBMS from a user workstation, and through which query results from said DBMS are made available to said user workstation;

(d) a processor that controls interactions between said primary memory, said secondary memory and said communications interface, and executes said compiled database routines, including said grouping function in response to a group by query received from said communications interface; wherein said grouping function comprises:

(i) an input procedure that reads said database table row by row and outputs for each row read a member row comprising a group identifier from said at least one group column and zero or more data fields corresponding to said zero or more data columns;

(ii) a matching procedure that calls said hash function, said hash function generating a hashed group value from said group identifier; and determines from contents of a hash table entry indexed by said hashed group value whether a matching group table entry exists with said group name identical to said group identifier;

(iii) an aggregation procedure that executes an aggregation function specified by said group by query, said aggregation procedure comprising a set of instructions for updating said matching group table entry with data from said member row;

(iv) an initialization procedure that allocates a new group table entry from said primary memory, initializes said new group table entry based on data from said member row and sets a pointer to said new group table entry in said hash table whenever said matching group table entry does not exist and predetermined memory availability criteria indicate there is sufficient primary memory for a new group table entry;

(v) an overflow procedure that generates an overflow row from said member row whenever said matching group table entry does not exist and said memory availability criteria indicate there is not sufficient primary memory for a new group table entry, said overflow procedure also updating said overflow file based on contents of said overflow row; and (vi) an overflow input procedure that reads data from said overflow file when all rows of said input table have been read and said overflow procedure has been executed, said overflow file reflecting data from all member rows not aggregated in said group table.

6. The DBMS of claim 5, said primary memory further comprising an overflow buffer maintained in said primary memory, wherein said overflow row generated by said overflow procedure is formatted identically to said member row, and said updating of said overflow file consists in said overflow procedure flushing said output buffer to said overflow file when said buffer is full and writing said overflow row into said output buffer.

7. The DBMS of claim 5, said primary memory further comprising an output buffer, wherein said overflow row generated by said overflow procedure is formatted identically to said group table entry, and said updating of said overflow file consists in said overflow procedure flushing said output buffer to said overflow file when said buffer is full and writing said overflow row into said output buffer.

8. The DBMS of claim 5, said primary memory further comprising an output buffer and a second hash table, said output buffer comprising a plurality of buffer entries each storing for a single group aggregated member data, a group name and housekeeping data, and said second hash table comprising a plurality of hash table entries each storing the address of a corresponding buffer entry, said address being retrievable from said second hash table at an index generated by applying said hash function to said group name of said corresponding buffer entry; wherein said updating of said overflow file consists in said overflow procedure (a) determining from contents of said second hash table whether a matching buffer entry with said group name identical to said group identifier exists in said output buffer;

(b) when a matching buffer entry exists, aggregating data from said overflow row into said matching buffer entry;

(c) when a matching buffer entry does not exist
  (i) when said buffer is full, appending contents of said buffer to said overflow file and resetting said second hash table; and
  (ii) writing a new buffer entry comprising said data from said overflow row and housekeeping data, initializing said new entry's buffer housekeeping data and providing a pointer to said new buffer entry in said second hash table.

* * * * *

UNITED STATES PATENT AND TRADEMARK OFFICE
CERTIFICATE OF CORRECTION

PATENT NO. : 5,511,190
DATED : April 23, 1996
INVENTOR(S) : Anoop Sharma et al.

It is certified that error appears in the above-identified patent and that said Letters Patent is hereby corrected as shown below:

Column 18,
Line 53, delete "a identifier" and insert therefor -- a group identifier --
Line 54, after "fields" insert -- corresponding --

Signed and Sealed this

Seventeenth Day of May, 2005

JON W. DUDAS
*Director of the United States Patent and Trademark Office*